(12) United States Patent
Murugesan

(10) Patent No.: US 8,976,303 B2
(45) Date of Patent: Mar. 10, 2015

(54) PRESENTING SNAPSHOT OF CONTROLLED DEVICE DISPLAY ON DISPLAY OF REMOTE COMMANDER TO FACILITATE CONTROL OF THE CONTROLLED DEVICE BY USER WHO CANNOT SEE CONTROLLED DEVICE

(75) Inventor: Sivakumar Murugesan, San Diego, CA (US)

(73) Assignee: Sony Corporation, Tokyo (JP)

(*) Notice: Subject to any disclaimer, the term of this patent is extended or adjusted under 35 U.S.C. 154(b) by 105 days.

(21) Appl. No.: 13/591,632

(22) Filed: Aug. 22, 2012

(65) Prior Publication Data

US 2014/0055681 A1  Feb. 27, 2014

(51) Int. Cl.
*H04N 5/445* (2011.01)

(52) U.S. Cl.
USPC ................ 348/734; 348/564; 348/569

(58) Field of Classification Search
CPC ..... H04N 5/44; H04N 5/445; H04N 5/44504; H04N 5/44543; H04N 5/4403; H04N 5/44582; H04N 5/765; H04N 5/44591; H04N 21/47; H04N 21/4316; H04N 21/4126; H04N 21/4131; H04N 21/482; H04N 21/485; H04N 21/42204; H04N 21/4227; H04N 2005/4403; H04N 2005/4405; H04N 2005/4408; H04N 2005/441; G06F 21/305; G06F 21/31; G06F 21/30; G06F 21/44; G06F 21/45

USPC ................ 348/734, 552, 706, 731, 564, 569; 341/176, 174, 175, 5.61, 5.64; 340/5.1, 340/5.2, 5.32, 5.61; 345/156, 168, 169, 345/173, 157

See application file for complete search history.

(56) References Cited

U.S. PATENT DOCUMENTS

| | | | |
|---|---|---|---|
| 5,959,539 A * | 9/1999 | Adolph et al. | 340/3.5 |
| 6,127,941 A * | 10/2000 | Van Ryzin | 340/4.37 |
| 7,428,023 B2 * | 9/2008 | Allen et al. | 348/734 |
| 7,436,346 B2 * | 10/2008 | Walter et al. | 341/176 |
| 7,538,665 B2 | 5/2009 | Kondo | |
| 7,821,377 B2 * | 10/2010 | Arai et al. | 340/3.71 |
| 8,054,211 B2 * | 11/2011 | Vidal | 341/176 |
| 8,072,550 B2 | 12/2011 | Tsunoda et al. | |

FOREIGN PATENT DOCUMENTS

JP      2003333362      11/2003

* cited by examiner

*Primary Examiner* — Trang U Tran
(74) *Attorney, Agent, or Firm* — John L. Rogitz

(57) ABSTRACT

A system includes a controlled device presenting on a device display an image including a native user interface (UI) and a remote commander (RC) communicating with the controlled device to receive the image and present it on an RC display, so that a user may manipulate the RC looking at the RC display to control the controlled device using the native UI even if the user cannot see the display of the controlled device.

19 Claims, 1 Drawing Sheet

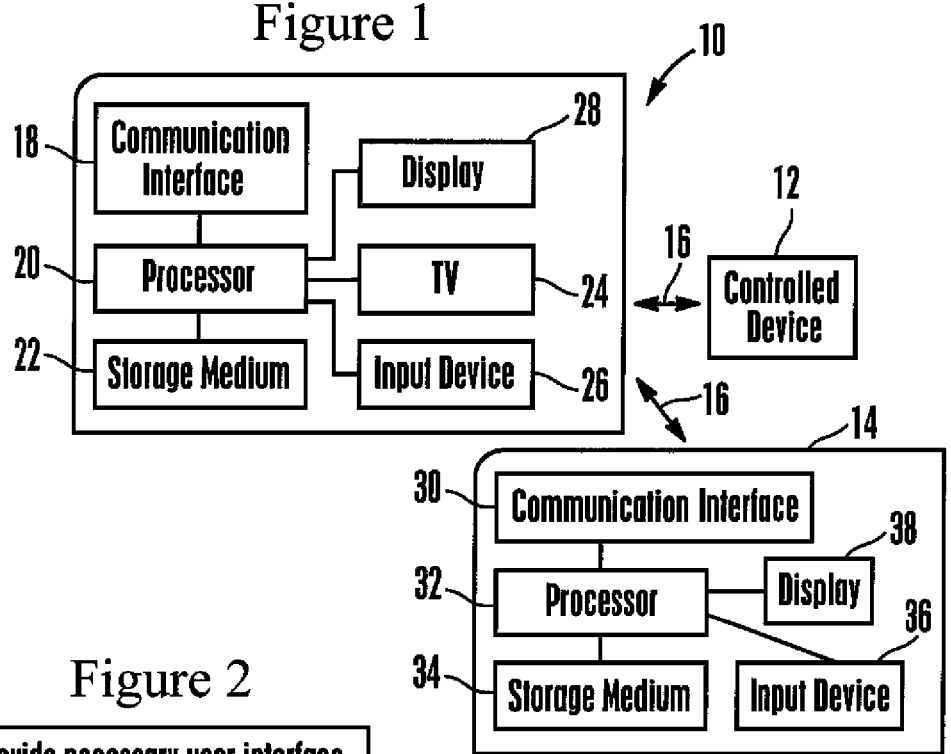
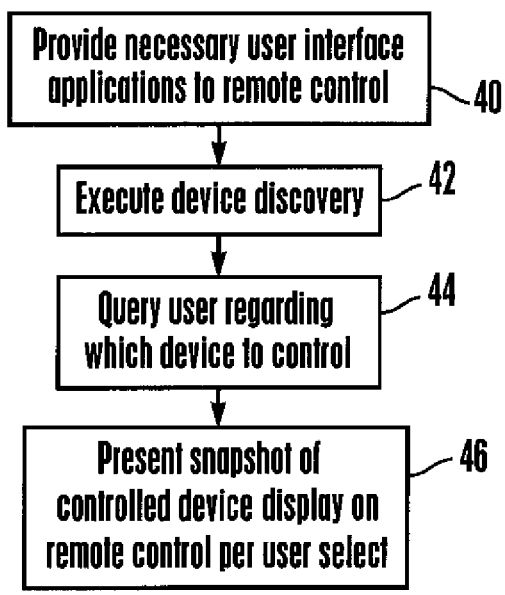
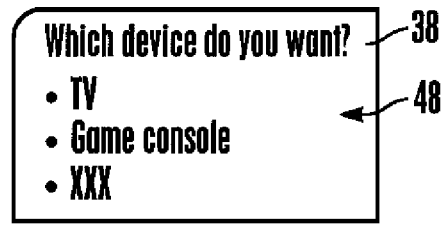
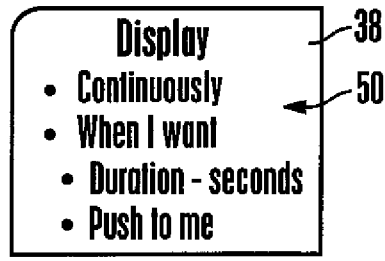
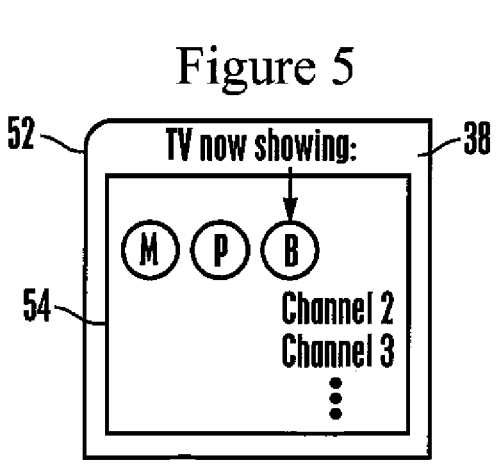

PRESENTING SNAPSHOT OF CONTROLLED
DEVICE DISPLAY ON DISPLAY OF REMOTE
COMMANDER TO FACILITATE CONTROL
OF THE CONTROLLED DEVICE BY USER
WHO CANNOT SEE CONTROLLED DEVICE

FIELD OF THE INVENTION

The present application is directed to presenting a snapshot of the display of a controlled device such as a TV on the display of a remote commander so that a person manipulating the remote commander can control the controlled device even though the person cannot see the display of the controlled device.

BACKGROUND OF THE INVENTION

Remote commanders (RC) are commonly used to control display devices such as TVs. As understood herein, a person using the RC may of always be able to see the user interface (UI) presented on the display but may nonetheless wish to control the display. For example, a person in a control room may want to control a device outside the room that is being watched by others, but not by the person in the control room.

SUMMARY OF THE INVENTION

Accordingly, a remote commander (RC) includes a processor, an RC display, and a computer readable storage medium accessible to the processor and bearing instructions to configure the processor to present a first user interface (UI) on the RC display. The first UI presents a list of candidate controlled devices from which a candidate controlled device can be selected to control. Responsive to selection of a candidate controlled device from the list, the processor presents on the RC display a second UI giving a user of the RC an option of how to present an image received from a device display of the controlled device. In turn, responsive to at least one selection from the second UI, the processor presents on the RC display a third UI indicating the identity the controlled device being controlled and showing on the RC display content being presented on the device display.

Note that the content from the controlled device may be video, a still snapshot (single image), or user interface, and the content may be presented on the entire RC display or in a window of the RC display that is less than the size of the RC display, with the window being movable by a user entering appropriate commands and with the size of the window being variable by a user entering appropriate commands. For example, a two finger pinch in motion on the RC display may cause the window to shrink, while a two finger pinch out motion on the RC display may cause the window to expand. The window can be moved on the RC display by pressing on the window and sliding a finger to the desired location of the window on the RC display. A user can dynamically map any subset of the controlled device's screen onto the RC display at any time and move (by, e.g., gestures or other input) the RC display so that it can map/show any subset of the controlled device's screen.

In examples, the content being presented on the device display is presented in a window of the third UI. A user of the RC may be permitted to navigate the third UI on the RC display, and the processor may be configured to in response to user navigation of the third UI send to the controlled device signals representative thereof. A user of the RC need not be able to visually see the controlled device to control it using its own UI, because its own UI is transmitted to the RC and displayed on the RC display.

In some examples the RC is provided with a software application to enable the processor to understand UIs it is receiving from the controlled device, including what various display elements represent and what functions are invoked when they are selected. In these examples, responsive to a user selecting an item presented in the third UI, the RC, knowing the function of the item, sends a corresponding command or function identification to the controlled device for execution thereof by the controlled device.

In other examples the RC does not know what it is presenting from the controlled device but simply presents an image as received from the controlled device without any knowledge that elements of the image represent selector elements and, thus, without knowing what function is being invoked when a user selects an element in the third UI. In such examples, the processor can be configured to note a location in the third UI at which a selection is made, sending the location to the display device, which correlates the location to a position of a selector element on its own UI the function which is known to the display device. Or, the third UI can be sent from the controlled device to the RC along with an initial focus location known to the display device and received by the RC, with the RC relaying navigation commands including "up", "down", "left", and "right" and any enter or select commands to the controlled device.

As disclosed in greater detail below, the third UI may present a video sent from the controlled device substantially as the video is being presented on the controlled device. Or, the third UI may present a snapshot from the controlled device sent from the controlled device substantially as the snapshot is being presented on the controlled device. In any case, in some implementations the second UI provides an option of defining how long an image from controlled device remains on the RC display.

In another aspect, a method includes providing one or more user interface (UI) software applications to a remote commander (RC) to enable the RC to recognize and understand UIs received from a controlled device. The RC has an RC display and the controlled device has a device display. The method includes executing device discovery among the controlled device and RC, querying a user of the RC which of plural controlled devices the user would like to control by means of the RC, and responsive to a user selection in response to the querying, presenting on the RC display an image being shown on the device display.

In another aspect, a system includes a controlled device configured for presenting on a device display an image including a native user interface (UI), and a remote commander (RC) configured for communicating with the controlled device to receive the image and present it on an RC display, so that a user is permitted to manipulate the RC while looking at the RC display to control the controlled device using the native UI even if the user cannot see the display of the controlled device.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an example system according to present principles;

FIG. 2 is a flow chart of example logic; and

FIGS. 3-5 are example screen shots of the remote commander.

DETAILED DESCRIPTION OF THE PREFERRED EMBODIMENT

Referring initially to FIG. 1, a system is shown, generally designated 10, which includes one or more controlled devices 12 which present audio video content and one or more remote commanders (RC) 14 for controlling the controlled devices 12 according to disclosure below even if a person manipulating the RC 14 cannot see the controlled device 12 being controlled. In an example embodiment, the devices 12 and RC 14 may communicate over wired or wireless paths 16 in, e.g., a home network using digital living network architecture (DLNA) or other network protocol such as but not limited to wired or wireless Ethernet, Transmission control Protocol/Internet Protocol (TCP/IP), Bluetooth, high definition multimedia interface (HDMI) with consumer electronics control (CEC), wireless telephony protocols such as global system for mobile communication (GSM) and variants thereof, code division multiple access (CDMA) and variants thereof, orthogonal frequency division multiplex (OFDM) and variants thereof.

Accordingly, taking the controlled device 12 shown in detail in FIG. 1 as an example, it being understood that other controlled devices include like components, the controlled device 12 includes one or more communication interfaces 18 communicating with one or more processors 20 accessing one or more computer readable storage media 22 such as solid state or disk-based memory. The one or more communication interfaces 18 may include an infrared (IR) transceiver, Bluetooth transceiver, HDMI/CEC port, Ethernet port, universal serial bus (USB) port, wired or wireless modem, wireless telephony transceivers such as GSM, CDMA, or OFDM transceivers. When the controlled device 12 is a TV it typically includes a TV tuner 24 and an input device 26 such as a TV control pad for channel up/down commands, volume up/down commands, and the like.

The processor 20 controls presentation of video content on a display 28. Without limitation, the display 28 may be a standard definition (SD) or high definition (HD) flat panel or matrix display that may include touch input capability, a cathode ray tube (CRT), or other type of video display. The device 12 may be, e.g., a TV, a game console, a home theater display system, etc.

Turning to the RC 14, the RC 14 includes one or more communication interfaces 30 communicating with one or more processors 32 accessing one or more computer readable storage media 34 such as solid state or disk-based memory. The RC 14 may be implemented by a smart phone, a tablet or slate computer, a personal digital assistant, a laptop or computer desktop computer, or other device.

The one or more communication interfaces 30 may include an infrared (IR) transceiver, Bluetooth transceiver, HDMI/CEC port, Ethernet port, universal serial bus (USB) port, wired or wireless modem, wireless telephony transceivers such as GSM, CDMA, or OFDM transceivers. Thus, one or more communication interfaces 30 of the RC 14 communicate with one or more communication interfaces 18 of the controlled device 12.

The RC 14 also may include one or more input devices 36 such as point-and-click devices, keyboards, keypads, and the like. For example, in addition to or in lieu of the above input devices, the input device 36 may be implemented by touch screen displays (discussed below), and/or cameras (for sensing user gestures on a touch surface or imaged by a camera that are then correlated to particular commands, such as scroll left/right and up/down, etc.), accelerometers (for sensing motion that can be correlated to a scroll command or other command), microphones for voice recognition technology for receiving user commands. The processor 32 controls presentation of video content on a display 38. Without limitation, the display 38 may be a standard definition (SD) or high definition (HD) flat panel or matrix display that may include touch input capability.

It is to be understood that the processors above accessing instructions on their respective computer readable media execute the logic and user interfaces (UI) discussed below.

Turning to FIG. 2, commencing at block 40 in some implementations, one or more user interface (UI) software applications are provided with the RC 14 to enable the RC 14 to recognize and understand UIs received from a controlled device 12. This provisioning may occur at time of manufacture or post-sale by downloading appropriate UI applications to the RC 14, e.g., upon user request by navigating a UI application website. In other embodiments described further below, no UI applications associated with display devices 12 may be provided to the RC 14.

Moving to block 42, device discovery is executed by the controlled devices 12 and RC 14. In one embodiment, this discovery may follow DLNA protocols, and/or use universal plug-and-play (UPnP) discovery, to ascertain the address and capabilities of each device being discovered. Zeroconf and Airplay can also be used. UPnP is an example of a technology that offers a very flexible architecture for managing connectivity of devices that share remote user interfaces and multimedia in the home. DLNA standardizes this by adding media formats and specific transport protocols to the basic UPnP devices. Less optimally, automatic device discovery may be dispensed with and the user instructed to key into the controlled device 12 and RC 14 necessary network and communication information related to the other device with which communication is sought to be established.

The logic may then move to block 44 to query the user of the RC 14 which of the controlled devices 12 the user would like to control by means of the RC 14. At block 46 a snapshot of the image currently being shown on the selected control device display is presented on the display 38 of the RC 14 per the user's selections discussed further below. Thus, when a UI is presented on the controlled device 12 sought to be controlled, that UI is transmitted over the link 16 to the RC 14 at block 46 and presented on the display 38, re-sized as appropriate by the RC processor 32 to fit on the display 38.

FIG. 3 shows a UI 48 that may be presented on the RC display 38 pursuant to device discovery at block 42. As shown, the UI 48 provides a list of discovered devices on the network that are candidates for being controlled devices using the RC 14. Note that in some embodiments the RC 14 may be vended with the controlled device 12 and thus preprogrammed to assume it will be controlling the device.

Responsive to a selection of a device from the UI 48 of FIG. 3, a UI 50 of FIG. 4 may be presented, giving the user of the RC 14 the option of how and when to present the snapshot of the image on the display 28 of the controlled device 12. For example, the user can select to continuously present, on the RC display 38, the image being presented on the controlled device display 28, so that video in such a case will be streamed continuously from the controlled device 12 to the RC 14. Or, the user may be given the option of selecting to present, on the RC display 38, the image being presented on the controlled device display 28 only upon command from the user. In this case, for example, the image being presented on the controlled device display 28 is presented on the RC display 38 only in response to the user inputting a command by, e.g., selecting a predetermined "present" key on the RC 14. As shown in FIG. 4, the user may also be given the option of defining how long the image being presented on the controlled device display 28 is to be presented on the RC display 38. During the period of display, only a snapshot, i.e., still image, of the image being presented on the controlled device display 28 may be presented on the RC display 38. Or, during the period of display, the actual video stream being presented on the controlled device display 28 can be presented on the RC display 38.

Yet again, as shown in FIG. 4 the user may be given the option of commanding the device being controlled to push to the RC the image being presented on the device being controlled when the device being controlled requires further input. For example, when the user selects "push to me" the device being controlled can automatically send the image it is presenting on its display to the RC at the end of a program or end of a disk-sourced movie or end of a chapter thereof.

FIG. 5 shows a UI 52 that may be presented on the RC display 38 responsive to the above selections. As shown, the UI 52 may include a text message indicating the name of the device being controlled and that it is showing content presented in a window 54 of the UI 52. In the example shown, the controlled device 12 happens to be presenting a UI known as a cross-media bar (XMB) which presents a row of icons indicating content genres, in this case and in order from left to right, movies, photos, and broadcast TV channels. The focus is on the broadcast TV icon and so a listing of channels appears under the broadcast TV icon. This same image is presented as shown on the RC display 38.

The user may thus navigate the XMB (or whatever UI is shown in the window 54) on the RC display 38 using a touch feature of the display 38 (if provided) and/or using the RC input device(s) 36, making selections from the UI, entering other commands such as channel tuning commands, and invoking additional controlled device 12 UIs for simultaneous presentation thereof on both displays 28, 38 to permit further control, using the RC 14, of the controlled device 12. In this way the user of the RC 14 need not be able to visually see the controlled device display 28 to control it using its own UI, because that UI is transmitted to the RC 14 and displayed thereon.

Note that as indicated at block 40, the RC 38 may be provided with the application(s) necessary to understand the UI it is receiving from the controlled device 12, including what various display elements represent and what functions are invoked when they are selected. In this case, when a user selects an item in the window 54, the RC 14, knowing the function of that item, simply sends the corresponding command or function identification to the controlled device 12 for execution thereof the by device processor 20.

In other embodiments, however, the RC 14 may not know what it is presenting from the controlled device 12, i.e., the RC 14 simply presents the image as received from the controlled device 12 without any knowledge that elements of the image represent selector elements and, thus, without knowing what function is being invoked when the user selects an element in the window 54. Present principles address this circumstance in two ways. One is that the RC 14 simply notes the location in the window a selection is made by, e.g., noting where a user touched the display 38, or noting where the screen cursor is when the user enters "select". It then sends the location to the display device 12, which correlates the location to a position of a selector element on its own UI the function which of course is known to the display device 12. As an example, suppose the window 54 is 100 pixels by 100 pixels, and a selection is made ten pixels from the top of the window and ten pixels from the right edge of the window. In this case the RC processor 32 informs the controlled device processor 20 that a selection has been made on the UI of the controlled device 20 that is 10% of the distance from top to bottom and 10% of the distance from right to left. The controlled device processor 20 then converts this relative screen position information to the dimensions of its own screen 28 to know what UI element has been selected.

Or, when a UI is sent from the controlled device 12 to the RC 14 it is sent with an initial focus location known to the display device 12 and RC 14. The RC 14 then simply relays navigation commands, such as "up", "down", "left", and "right" and any enter or select commands to the controlled device 12. Knowing where the focus started, the controlled device 12 can thus know to where the user moved the focus when a select or enter command is received as relayed by the RC 14, invoking the corresponding function accordingly.

When the user has completed the desired control, he may select another controlled device to control by invoking the UI 48 in FIG. 3 from, e.g., a start up or other menu.

While the particular PRESENTING SNAPSHOT OF CONTROLLED DEVICE DISPLAY ON DISPLAY OF REMOTE COMMANDER TO FACILITATE CONTROL OF THE CONTROLLED DEVICE BY USER WHO CANNOT SEE CONTROLLED DEVICE is herein shown and described in detail, it is to be understood that the subject matter which is encompassed by the present invention is limited only by the claims.

What is claimed is:

1. A remote commander (RC) comprising:
 a processor:
 an RC display and
 a computer readable storage medium accessible to the processor and bearing instructions to configure the processor to:
 present a first user interface (UI) on the RC display, the first UI presenting a list of candidate controlled devices from which a candidate controlled device can be selected to control;
 responsive to selection of a candidate controlled device from the list, present on the RC display a second UI giving a user of the RC an option of how to present on the RC an image received from a device display of the controlled device;
 responsive to at least one selection from the second UI, present on the RC display a third UI indicating the identity of the controlled device being controlled and showing on the RC display content being displayed on the device display.

2. The RC of claim 1, wherein the instructions when executed by the processor configure the processor to present content being presented on the device display in a window of the third UI.

3. The RC of claim 1, wherein the instructions when executed by the processor configure the processor to permit a user of the RC to navigate the third UI on the RC display, and the instructions when executed by the processor configure the processor to, in response to user navigation of the third UI, send to the controlled device signals representative thereof.

4. The RC of claim 1, wherein a user of the RC need not be able to visually see the controlled device to control it using its own UI, because its own UI is transmitted to the RC and displayed on the RC display.

5. The RC of claim 1, wherein the RC is provided with a software application to enable the processor to understand UIs it is receiving from the controlled device, including what various display elements represent and what functions are invoked when they are selected.

6. The RC of claim 5, wherein the instructions when executed by the processor configure the processor to, responsive to a user selecting an item presented in the third UI, send a corresponding command or function identification to the controlled device for execution thereof by the controlled device.

7. The RC of claim 1, wherein the RC does not know what it is presenting from the controlled device but simply presents an image as received from the controlled device without any knowledge that elements of the image represent selector elements and, thus, without knowing what function is being invoked when a user selects an element in the third UI.

8. The RC of claim 7, wherein the instructions when executed by the processor configure the processor to note a location in the third UI at which a selection is made, sending the location to the display device, which correlates the location to a position of a selector element on its own UI the function which is known to the display device.

9. The RC of claim 7, wherein the instructions when executed by the processor configure the processor to send the third UI from the controlled device to the RC along with an initial focus location known to the display device and received by the RC, the instructions when executed by the processor configure the processor to relay navigation commands including "up", "down", "left", and "right" and any enter or select commands to the controlled device.

10. The RC of claim 1, wherein the third UI presents a video sent from the controlled device substantially as the video is being presented on the controlled device.

11. The RC of claim 1, wherein the third UI presents a snapshot from the controlled device sent from the controlled device substantially as the snapshot is being presented on the controlled device.

12. The RC of claim 1, wherein the second UI provides an option of defining how long an image from controlled device remains on the RC display.

13. A system, comprising:
a controlled device configured for presenting on a device display an image including a native user interface (UI); and
a remote commander (RC) configured to:
communicate with the controlled device to receive the image being displayed on the controlled device;
present the image being presented on the controlled device on an RC display, so that a user is permitted to manipulate the RC while looking at the RC display to control the controlled device using the native UI even if the user cannot see the display of the controlled device;
present a first user interface (UI) on the RC display, the first UI when presented displaying a list of candidate controlled devices from which a candidate controlled device can he selected to control;
responsive to selection of a candidate controlled device from the list, present on the RC display a second UI giving a user of the RC an option of how to present an image received front a device display of the controlled device; and
responsive to at least one selection from the second UI, present on the RC display a third UI indicating the identity the controlled device being controlled and showing on the RC display content being presented on the device display.

14. A device comprising:
a non-transitory computer memory with instructions which when executed by at least one processor configure the processor to:
present a first user interface (UI) on a remote commander (RC) display, the first UI presenting a list of candidate controlled devices from which a candidate controlled device can be selected to control;
responsive to selection of a candidate controlled device from the list, present on the RC display a second UI giving a user of the RC an option of how to present on the RC an image received from a device display of the controlled device;
responsive to at least one selection from the second UI, resent on the RC display a third UI indicating the identity o the controlled device being controlled and showing on the RC display content being displayed on the device display.

15. The device of claim 14, wherein the content being presented on the device display is presented in a endow of the third UI.

16. The device of claim 14, wherein the RC does not know what it is presenting from the controlled device but simply presents an image as receive from the controlled device without any knowledge that elements of the image represent selector elements and, thus, without knowing what function is being invoked when a user selects an element in the third UI.

17. The device of claim 16, wherein the instructions when executed by the processor configure the processor to note a location in the third UI at which a selection is made, sending the location to the display device, which correlates the location to a position of a selector element on its own UI the function which is known to the display device.

18. The device of claim 16, wherein the instructions when executed by the processor configure the processor to send the third UI from the controlled device to the RC along with an initial focus location known to the display device and received by the RC, the instructions when executed by the processor configure the processor to relay navigation commands including "up", "down", "left", and "right" and any enter or select commands to the controlled device.

19. The device of claim 14, wherein the second UI provides an option of defining how long an image from a controlled device remains on the RC display.

* * * * *